United States Patent [19]

Frost et al.

[11] Patent Number: 4,701,337

[45] Date of Patent: Oct. 20, 1987

[54] CHOCOLATE PRODUCT CONTAINING DIPEPTIDE-COCOA BUTTER COMPOSITION

[75] Inventors: John R. Frost, Tarrytown; Nancy J. Sarich, Putnam Valley, both of N.Y.; Timothy W. Schenz, Haworth; Alfred C. Glatz, Summit, both of N.J.

[73] Assignee: General Foods Corporation, White Plains, N.Y.

[21] Appl. No.: 782,237

[22] Filed: Sep. 30, 1985

Related U.S. Application Data

[63] Continuation-in-part of Ser. No. 755,231, Jul. 15, 1985, abandoned, which is a continuation of Ser. No. 531,525, Sep. 12, 1983, Pat. No. 4,536,410.

[51] Int. Cl.⁴ .............................................. A23G 1/00
[52] U.S. Cl. .................................... 426/548; 426/573; 426/660; 426/613
[58] Field of Search ............... 426/548, 573, 660, 613

[56] References Cited

U.S. PATENT DOCUMENTS

| | | | |
|---|---|---|---|
| 3,360,376 | 12/1967 | Dobson et al. | 426/573 |
| 3,397,997 | 8/1968 | Japiske et al. | 426/573 |
| 3,425,842 | 2/1969 | Japiske | 426/573 X |
| 3,475,403 | 10/1969 | Mazur et al. | 426/548 X |
| 3,642,491 | 2/1972 | Schlatter | 426/548 |
| 3,928,633 | 12/1975 | Shoaf et al. | 426/548 X |
| 3,956,507 | 5/1976 | Shoaf et al. | 426/548 X |
| 4,382,924 | 5/1984 | Berling et al. | 426/548 X |
| 4,465,694 | 8/1984 | Okada | 426/548 X |
| 4,536,410 | 8/1985 | Vaccaro et al. | 426/548 |

OTHER PUBLICATIONS

"Equa 200 TM (Aspartame) Sweetener as a Food Ingredient", Sep. 27, 1974, Searle Bio-chemics: Arlington Height, Ill., p. 2.

*Primary Examiner*—Joseph Golian
*Attorney, Agent, or Firm*—Thomas A. Marcoux; Thomas R. Savoie; Daniel J. Donovan

[57] ABSTRACT

A composition which modifies the physical characteristics of a lipid is disclosed. This composition comprises a hydrated, crystalline dipeptide sweetener and a lipid and can be used to produce a non-waxy, no melt chocolate by utilizing cocoa butter as the lipid source.

15 Claims, No Drawings

CHOCOLATE PRODUCT CONTAINING DIPEPTIDE-COCOA BUTTER COMPOSITION

This is a continuation-in-part of Ser. No. 755,231, filed on July 15, 1985, now abandoned, which is a continuation of Ser. No. 531,525 filed Sept. 12, 1983, now U.S. Pat. No. 4,536,410.

FIELD OF THE INVENTION

The present invention relates to a dipeptide-cocoa butter composition. More particularly the present invention is concerned with a chocolate product containing a dipeptide-cocoa butter composition.

DESCRIPTION OF THE PRIOR ART

Dipeptide sweeteners such as α-L-aspartyl-L-phenylalanime-methyl ester (aspartame or APM) disclosed by Schlatter in U.S. Pat. No. 3,492,131; the L-aspartyl-D-alaninamides and L-aspartyl-D-serinamided disclosed in U.S. Pat. No. 4,373,430; and L-α-aspartyl-L-tyrosine disclosed n U.S. Pat. No. 4,017,422 are generally known as low-calorie sweetening agents which have the quality of possessing a clear initial taste without an unpleasant bitter aftertaste. Nonetheless, heat and enzymes readily degrade aspartame in an aqueous environment causing aspartame to be far less stable then other well-known sweeteners such as sugars, polyols and synthetic chemical sweeteners such as cyclamate and saccharin. Because of this stability, food processors need a means of preserving dipeptide sweeteners throughout standard food processing procedures.

Unlike dipeptide sweeteners, lipids, even in an aqueous environment, can withstand considerable heat. Nonetheless, the physical structure of a lipid—its double bonds, the location of its double bonds, and the stereochemistry of its double bonds—normally determines the lipids other properties. However, food processors typically desire a mix of properties not available with any one particular lipid, for example, a flaky pie crust requires a hard fat, but nutritionally, polyunsaturated oils are preferred. Consequently, food processors desire a method for modifying lipid properties.

European Patent Office publication number 0,137,326 published Apr. 17, 1985 to TSAU, et al. discloses a heat stabilized composition of aspartame in a partially hydrogenated vegetable oil wherein the aspartame is coated with the oil to prevent if from dissolving. The oil is then allowed to harden and is then filtered to obtain the desired particle size. The APM is released at temperatures above the melting point of the fat in which it has been encased. It would be desirable to find a method of modifying the physical characteristics of a lipid using APM such that APM retains its integrity and stability at temperatures well beyond the melting point of the particular lipid being utilized. It would further be desirable to utilized such a mechanism in a chocolate product to product a non-waxy, non-melting, chocolate.

SUMMARY OF THE INVENTION

Accordingly, one object of the present invention is to provide a low-calorie dipeptide sweetener composition with improved stability.

Another object of the present invention is to provide a means for modifying the physical attributes of a lipid.

Another object of this invention is to provide a good tasting chocolate which does not melt at hand/body temperature (37° C.).

It is yet another object of the present invention to provide a dipeptide sweetener composition in which the dipeptide is stabilized but nonetheless has no discernible effect on the sweetness quality of the dipeptide sweetener.

Briefly, these and other objects of the present invention, as will hereinafter be more readily apparent, can be obtained by a dipeptide sweetener composition which comprises a hydrated dipeptide sweetener and a lipid.

DETAILED DESCRIPTION OF THE INVENTION

While aspartame is the preferred dipeptide sweetener of the present invention, aspartame is only functional in the present invention when it is hydrated with between about 0.02 and about 1 part water per each part aspartame. However, it is preferred that the aspartame be hydrated with between about 0.02 and about 0.5 parts water for each part aspartame. It is further preferred that the aspartame contain between about 0.02 and about 0.3 parts water per part aspartame. Moreover, it is essential that the aspartame be substantially in a crystalline form and that at least some of the water is water of crystallization, and preferredly some water is absorbed on the surface of the aspartame.

While any lipid may be useful in the present invention, it is preferred that the lipid component be selected from the group composed of hydrocarbons, aliphatic alcohols, aliphatic acids, esters of aliphatic acids, glycerol containing lipids and combinations thereof. It is more preferred that the lipid component of the present invention be selected from the group composed of aliphatic acids, esters of aliphatic acids, glycerol containing lipids and combinations thereof. Aliphatic fatty acids esters are more preferred and the aliphatic fatty acid esters of glycerol are the most preferred lipids of the present invention. Examples of aliphatic fatty acid triesters useful in the present invention comprise tallow, lard, cocoa butter, palm oil, palm kernel oil, coconut oil, cotton seed oil, peanut oil, rape seed oil, corn oil, safflower oil, sunflower oil, soy bean oil and combinations thereof. Glycerol diesters, proplyene glycol diesters, and combinations thereof are examples of aliphatic fatty acid diesters useful in the present invention. Fatty acid monoesters useful in this invention comprise: monoglycerides, propylene glycol and monostearate and combinations thereof. Moreover, it is preferred that the fatty acid residues of the esters consist essentially of saturated, unsaturated, and polyunsaturated aliphatic acids containing between about 10 and about 30 carbon atoms, and combinations thereof.

The hydrated dipeptide sweetener is combined with at least about 1 but less than about 100 parts of lipid for each part of the dipeptide sweetener. However, it is preferred that at least about 3; more preferably at least about 5; and most preferably at least about 10 parts of lipid are combined with each part dipeptide sweetener. Furthermore, it is preferred that less then about 30 parts and more preferably, less than about 20 parts of lipid are combined with each part dipeptide sweetener. Typically, this admixture is heated to a temperature above about 25° C., preferably to a temperature above about 50° C. Additionally, the dipeptide sweetener-lipid admixture is agitated so as to thoroughly blend the components. Nonetheless, it is preferred that the admixture is kept at or below the temperature at which the lipid used decomposes, a temperature commonly known as the lipid's smoke point. It is further preferred that the admixture temperature be kept at least 10° C. below this lipid decomposition temperature or smoke point. It is also preferred that the lipid temperature, at the time the aspartame is combined with the lipid, is less than the temperature at which aspartame, if heated alone, would decompose. Thus it is preferred that the lipid temperature at the time the lipid component and the aspartame are combined is less than about 195° C., and more preferably this temperature is less than about 175° C. However, once the aspartame lipid gel has started to form, the admixture may be heated to the lipids decomposition temperature even if this temperature exceeds the aspartame decomposition temperature without destroying the gel.

While it is possible to incorporate additional ingredients or materials into the dipeptide sweetener-lipid admixture before the gel's formation, some additional ingredients will, at some concentrations, inhibit or prevent the gel's formation, e.g. large amounts of water. Thus it is also preferred that the dipeptide sweetener-lipid combination contain other materials at a level less than the level at which the other materials are effective to inhibit the gel's formation.

The heating step in the process of the instant invention may be accomplished by any conventional heating means including: conduction, convection, radiation, microwave, and combinations thereof.

The time and temperature of heating necessary to produce the thermally irreversible thixotropic gel of the present invention are inversely related. Thus, the higher the temperature to which the admixture is heated, the shorter the necessary heating period. However, the admixture should be heated for about at least 10 seconds and preferably at least about 30 seconds, and most preferably, the admixture is heated for at least about 5 minutes. Nonetheless, the dipeptide sweetener-lipid admixture is preferably heated for less than about 72 hours.

As a result of this heating, unlike most fluids, the viscosity of the admixture increases. Minimumly, the admixture should be heated at a temperature and for a time effective to produce at least about a 100% (1.0 fold) increase in the viscosity. This increase in the viscosity is determined by measuring the viscosity of the admixture; subtracting the viscosity of the lipid with the dipeptide sweetener added at the instant the dipeptide sweetener was added to the lipid from the viscosity of the admixture; and dividing this quantity by the viscosity of the lipid with the dipeptide sweetener added at the instant the dipeptide sweetener was added to the lipid. All of these viscosity measurements are made at the same temperature, which temperature is above the lipid component's melting point or range. Restated, the increase in viscosity is determined by the following formula:

$$\Delta\eta = \frac{(\eta_A - \eta_L)}{\eta_L}$$

wherein,
$\Delta\eta$ is the increase in viscosity;
$\eta_A$ is the viscosity of the admixture; and
$\eta_L$ is the viscosity of the lipid and dipeptide sweetener combination at the point in time at which the dipeptide sweetener is added to the lipid. Thus, $\eta_L$ compensates for the increase in viscosity due to the presence of an additive dispersed in the lipid.

In most cases $\eta_L$ will be approximately equal to the viscosity of the oil alone.

However, it is preferred that the heating be for a time and at a temperature effective to produce a viscosity increase about at least about 1,000% (10) and more preferably at least about 10,000% (100). Nonetheless, the viscosity increase is preferably less than about $10^7$ fold.

While viscosity may be measured in a number of ways, the Brookfield HAT Viscometer is an especially preferred instrument for measuring the viscosity of the gel of the instant invention. In measuring the viscosity of the gel of the instant invention with a Brookfield HAT Viscometer, a configuration of said instrument comprising a helipath stand and either a cylindrical or a T-bar spindle is further preferred. Typical use of this instrument will require placing about 200 ml of the material whose viscosity is to be measured in a 250 ml beaker. Next, an appropriate spindle and rotation speed (rpm) is chosen for the Viscometer to obtain a reading within the range of the instrument's indicator. Then, using for example the helipath stand and a T-bar spindle, the instrument is turned on and the spinning spindle is allowed to penetrate the sample. While the spinning spindle is in the sample, a dial or indicator reading is made. The dial reading is converted to a centipoise viscosity measurement by multiplying the dial reading by a factor that is appropriate for the spindle and the speed of rotation used. Thus, the "F" T-bar rotating at 0.5 rpm dial reading is multiplied by $4 \times 10^5$, and the #2 cylindrical spindle rotating at 50 rpm dial reading is multiplied by 16.

A sweet, good tasting chocolate which does not melt at hand-body temperature (37° C.), may be prepared by combining the dipeptide sweetener of the present invention with cocoa butter which serves at the lipid source.

Typically, the concentration of sweetener to cocoa butter will be from about 0.5–15 grams sweetener per 100 grams of cocoa butter and more preferrably from about 2–8 grams of sweetener per 100 grams of cocoa butter.

To prepare the chocolate of the present invention the cocoa butter is first heated so as to melt the fat. The dipeptide sweetener is then admixed with the melted cocoa butter and the resulting mixture heated to a temperature of from about 36° C. to about 195° C. and more preferably from 50° C. to 175° C. to increase the viscosity of the mixture. The time for which the admixture is held is directly related to temperature but is typically no more than 72 hours. Afterwards the mixture of cocoa butter and dipeptide sweetener is cooled to a temperature of below 20° C.

This cooled dipeptide-cocoa butter gel composition is then used as a replacement for the lipid fractions of conventional chocolate manufacture. Typically, chocolate is produced by admixing a lipid source, lecithin, sugar, milk powder and chocolate liquor; refining the resulting mixture by passing it through rolls to achieve the desired particle size; followed by conching, which is defined as a mixing process which is responsible for flavor development by means of a mixer commonly known as a conch, for a period of from about 1 hour to about 100 hours so that the mixture becomes a fluid, tempering which is defined as melting the chocolate so as to make it entirely amorphous (non-crystalline) followed by lowering the temperature so as to re-seed the proper cocoa butter crystal form, at a temperature of from about 25° C. to about 27° C. for from about 5 minutes to about 1 hour to achieve proper crystal formation and pouring into molds to achieve the desired form, and finally storing the mixture at 10° C. for a period of from about 1 hour to about 24 hours to set the chocolate. The above process is routinely utilized in the manufacture of chocolate and is well known to those skilled in the art of chocolate manufacturing. Further discussion on chocolate processing may be found in "Chocolate Cocoa & Confectionary; Science & Technology" by Bernard Minifie, published in 1970 which is herein incorporated by reference. The dipeptide sweetener cocoa butter gel typically will comprise from 5 to about 40% by weight of the final product and more typically 15 to about 30%. The lecithin will comprise between 0.01 and about 3% of the final product and more preferably 0.2 to 1%. The sugar component typically comprises from about 30 to about 65% of the final product and more preferrably from 50 to 60%. The milk powder should comprise between 0.01 and 20% of the final product and more preferably between 10 and about 15%, while the chocolate liquor component comprises from about 3 to about 30% of the final product and more preferably from 8 to 12%.

EXAMPLE

Cocoa butter, 1221 grams, was heated in a double boiler at 50° C. until thoroughly melted. To this melted cocoa butter was added 130 grams of APM. This mixture was blended and heated to 94° C. for 30 minutes to set the mixture. The mixture, after setting, was then cooled to below room temperature. This APM-cocoa butter gel composition was then mixed with sugar (3194 grams), lecithin (28 grams), milk powder (740 grams), and chocolate liquor (568 grams) and the resulting mixture was mixed by using a melanqeor. This mixture was then refined by passing through refining rolls to produce particles of about 40 microns in size, conched for approximately 2 hours to fluidize the mixture, tempered at 27° C. for approximately 15 minutes to achieve crystal proper formation and finally molded to the desired form and stored at 10° C. for 2 hours to set the chocolate.

What is claimed:

1. A method of producing a chocolate which does not melt at body/hand temperature comprising the steps of:
    (a) adding a hydrated, crystalline dipeptide sweetener to melted cocoa butter and heating to a temperature of from about 36° C. to about 195° C. for a time sufficient to form a gel which is thermally irreversible said sweetener containing water of crystallization wherein said hydrated sweetener comprises between about 0.02 and about 1.0 parts water per part dipeptide and wherein said gel contains by weight between about 0.5 and about 15 grams hydrated crystalline dipeptide sweetener per 100 grams of cocoa butter;
    (b) cooling said gel of melted cocoa butter and dipeptide sweetener to a temperature below 20° C.;
    (c) mixing the product of step (b) with lecithin, sugar, milk powder and chocolate liquor;
    (d) refining the mixture of step (c) by passing same through rolls to produce particles between about 35 to about 50 microns in size;
    (e) conching the mixture until it becomes a fluid;
    (f) tempering the resulting mixture for a time sufficient for crystal formation; and
    (g) pouring the resulting mixture into molds and storing until the mixture is set.
2. The method of claim 1 wherein the mixture is heated to a temperature of from 50° C. to about 175° C.
3. The method of claim 1 wherein the dipeptide cocoa butter gel composition of step c comprises from about 5 to above 40% by weight of the final chocolate product.
4. The method of claim 3 wherein the dipeptide cocoa butter gel composition comprises from about 15 to about 30% by weight.
5. The method of claim 1 wherein the lecithin component of step c comprises from about 0.01 to about 3% by weight of the final product.
6. The method of claim 5 wherein the lecithin comprises from about 0.2 to about 1%.
7. The method of claim 1 wherein the sugar component of step c comprises from about 30 to about 65% by weight of the final product.
8. The method of claim 1 wherein the sugar comprises from about 50 to about 60%.
9. The method of claim 1 wherein the milk powder component of step c comprises from about 0.01 to about 20% by weight of the final product.
10. The method of claim 9 wherein the milk powder comprises from about 10 to about 15%.
11. The method of claim 1 wherein the chocolate liquor component of step c comprises from about 3 to about 30% by weight of the final product.
12. The method of claim 11 wherein the chocolate liquor comprises from about 8 to about 12%.
13. The method of claim 1 wherein the dipeptide sweetener is APM.
14. An improved chocolate which does not melt at hand/body temperature wherein the improvement comprises replacing the cocoa butter fraction of said chocolate with a dipeptide sweetener-cocoa butter thermally irreversible gel composition comprising a hydrated, crystalline, dipeptide sweetener containing water of crystallization wherein said hydrated dipeptide sweetener comprises between about 0.02 and about 1.0 parts water per part dipeptide sweetener and wherein the composition contains by weight between 0.5 and about 15 grams hydrated dipeptide sweetener per 100 grams of cocoa butter.
15. The improved chocolate of claim 14 wherein the dipeptide sweetener is APM.

* * * * *